United States Patent
Kurokawa

(10) Patent No.: US 8,319,641 B2
(45) Date of Patent: Nov. 27, 2012

(54) ARTICLE MANAGEMENT METHOD INCLUDING SHARED MEMORY AND READER/WRITERS

(75) Inventor: Yoshiyuki Kurokawa, Sagamihara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 1023 days.

(21) Appl. No.: 11/902,717

(22) Filed: Sep. 25, 2007

(65) Prior Publication Data

US 2008/0074237 A1 Mar. 27, 2008

(30) Foreign Application Priority Data

Sep. 26, 2006 (JP) ................ 2006-260530

(51) Int. Cl.
*G08B 21/00* (2006.01)
(52) U.S. Cl. ............ 340/572.1; 340/10.1; 340/10.2; 340/572.4; 705/28; 342/42
(58) Field of Classification Search .... 340/572.1–572.9; 705/28; 342/42
See application file for complete search history.

(56) References Cited

U.S. PATENT DOCUMENTS

| | | | | |
|---|---|---|---|---|
| 5,959,568 A * | 9/1999 | Woolley | ............ | 342/42 |
| 7,030,761 B2 * | 4/2006 | Bridgelall et al. | ......... | 340/572.2 |
| 7,048,183 B2 * | 5/2006 | Coughlin et al. | ............ | 235/382 |
| 2003/0121985 A1 | 7/2003 | Baldischweiler et al. | | |
| 2004/0135674 A1 * | 7/2004 | Shanks et al. | ................ | 340/10.1 |
| 2004/0145454 A1 | 7/2004 | Powell et al. | | |
| 2005/0190098 A1 | 9/2005 | Bridgelall et al. | | |
| 2006/0044147 A1 | 3/2006 | Knox et al. | | |
| 2006/0290484 A1 | 12/2006 | Bauchot et al. | | |
| 2007/0073513 A1 | 3/2007 | Posamentier | | |
| 2007/0075873 A1 | 4/2007 | Yang et al. | | |
| 2007/0135961 A1 | 6/2007 | Ishida et al. | | |

FOREIGN PATENT DOCUMENTS

| | | |
|---|---|---|
| EP | 1 666 382 | 6/2006 |
| JP | 01-242303 A | 9/1989 |
| JP | 11-130213 A | 5/1999 |

(Continued)

OTHER PUBLICATIONS

International Search Report (Application No. PCT/JP2007/069128) dated Dec. 25, 2007.

(Continued)

*Primary Examiner* — Jennifer Mehmood
*Assistant Examiner* — Mark Rushing
(74) *Attorney, Agent, or Firm* — Eric J. Robinson; Robinson Intellectual Property Law Office, P.C.

(57) ABSTRACT

The object of the present invention is to provide an article management method by which detecting the location of an object is performed easily and introduction costs for detecting the location of an object are suppressed. The article management method includes a first RF chip attached to an article, a first reader/writer into which a shared memory portion and a second RF chip are incorporated, and a second reader/writer. The first reader/writer obtains information stored in the first RF chip, the shared memory portion retains the obtained information about the first RF chip, the second RF chip reads out that information about the first RF chip stored in the shared memory portion, the second reader/writer, by the second RF chip, obtains the information about the first RF chip and information stored in the second RF chip and information about the location of the second RF chip.

12 Claims, 11 Drawing Sheets

FOREIGN PATENT DOCUMENTS

| | | |
|---|---|---|
| JP | 2000-134809 A | 5/2000 |
| JP | 2000-315250 A | 11/2000 |
| JP | 2001-022905 A | 1/2001 |
| JP | 2001-031218 | 2/2001 |
| JP | 2002-240913 | 8/2002 |
| JP | 2002-259921 | 9/2002 |
| JP | 2005-065096 | 3/2005 |
| JP | 2005-092343 | 4/2005 |
| JP | 2005-316724 | 11/2005 |
| JP | 2005-320074 A | 11/2005 |
| JP | 2005-335129 | 12/2005 |
| JP | 2006-503376 | 1/2006 |
| JP | 2006-133128 A | 5/2006 |
| JP | 2007-043316 | 2/2007 |
| WO | WO 2004/036482 | 4/2004 |
| WO | WO 2006/025235 | 3/2006 |

OTHER PUBLICATIONS

Written Opinion (Application No. PCT/JP2007/069128) dated Dec. 25, 2007.

Specification, drawings, and claims of Application U.S. Appl. No. 11/802,246, filed May 21, 2007.

International Search Report (Application No. PCT/JP2007/060313) dated Jun. 19, 2007.

Written Opinion (Application No. PCT/JP2007/060313) dated Jun. 19, 2007.

* cited by examiner

ARTICLE MANAGEMENT METHOD INCLUDING SHARED MEMORY AND READER/WRITERS

BACKGROUND OF THE INVENTION

1. Field of Invention

The present invention relates to a method for managing articles. In particular, the present invention relates to an article location management method for managing information about the location of an article using wireless communication.

2. Description of the Related Art

In recent years, miniature semiconductor devices into which ultrasmall integrated circuit (IC) chips and antennas for wireless communication use (hereinafter, radio frequency (RF) chips) are incorporated have been attracting a lot of attention. In RF chips, by transfer of communication signals (an operating electric field) using a wireless communication device (hereinafter, a reader/writer), data can be written and data can be read. It is to be noted that RF chips are also called IC tags, IC chips, RF tags, wireless tags, electronic tags, and the like.

For a field of application of RF chips, for example, article management for the retail industry can be given. At the present time, goods management using barcodes and the like is predominate; however, because barcodes are read optically, the barcodes cannot be read if there is any shielding over them. For RF chips, on the other hand, because data is read wirelessly, RF chips can be read even if there is shielding. For this reason, making article management more efficient, lower cost, and the like is expected. In addition, use in a wide range of applications, such as use in transportation tickets, air passenger tickets, automatic reset fares, and the like, is also expected. A mechanism for identification and management of people and things by a miniature semiconductor device with which transmission and reception of data is performed by wireless communication in this way is called radio frequency identification (RFID), and its use as a base technology of an IT-based society is gaining attention.

In article management in the retail industry, in addition to management of whether there are goods or not, management of the location of goods is becoming important, as well. If management of the location of goods can be achieved, for example, the time it takes to locate something in a warehouse can be shortened. In addition, because goods can be tracked, by knowledge of consumer trends, for example, services with an even higher value added to them can be provided.

For example, for a system for management of the location of an article in a warehouse, approximation of the location of an article to which a barcode that is read by a barcode reader is attached, based on the location of the barcode reader at the time the barcode is read, is proposed (refer to Patent Document 1). Furthermore, a system for direct management of the location of an article to which an RF chip that has a function for detection of the location of articles is attached, where a reader/writer reads the RF chip, is proposed (refer to Patent Document 2).

Patent Document 1: Japanese Published Patent Application No. 2001-31218
Patent Document 2: Japanese Published Patent Application No. 2002-240913

However, in an article management method that uses barcodes, there is a problem in that a barcode cannot be read by a sensor if there is any shielding in front of the barcode. For this reason, for barcode management, there is a need to devise a storage method in which goods are arranged so that the barcodes are exposed and the like.

In addition, for an article management method that uses active RF tags for the RF tags, there is a problem in that introduction costs greatly increase. Furthermore, when passive RF tags are used in order to reduce introduction costs, there is a problem in that application is limited to small warehouses because communication distances are short.

SUMMARY OF THE INVENTION

The present invention is an article management method with which exchange of data is performed by wireless communication, and it is an object of the present invention to provide an article management method in which detection of the location of articles can be performed easily and in which introduction costs for detection of the location of articles can be suppressed.

The present invention is an object formed in consideration of the above problems. The present invention is an invention in which information stored in an RF chip attached to an article is read by a first reader/writer, where, through a second RF chip included in the first reader/writer, information stored in a first RF chip, information stored in the second RF chip, and information about the location of the second RF chip is received by a second reader/writer. That is, an article management method of the present invention includes a first RF chip that is attached to an article; a first reader/writer that reads information stored in the first RF chip; a second RF chip that reads out the information stored in the first RF chip through a shared memory portion incorporated in the first reader/writer; and a second reader/writer that obtains the information stored in the first RF chip and information stored in the second RF chip by the second RF chip and information about the location of the second RF chip.

An article management method of the present invention is one that includes a first RF chip attached to an article, a first reader/writer that performs transmission and reception of signals with the first RF chip, a shared memory portion and a second RF chip that are incorporated into the first reader/writer, and a second reader/writer that performs transmission and reception of signals with the second RF chip. The first reader/writer obtains information stored in the first RF chip; the shared memory portion retains the information stored in the first RF chip that is obtained by the first reader/writer; the second RF chip reads out the information stored in the first RF chip that is stored in the shared memory portion; and the second reader/writer obtains the information stored in the first RF chip and information stored in the second RF chip by the second RF chip and obtains information about the location of the second RF chip.

Another article management method of the present invention is one that includes a first RF chip attached to an article, a first reader/writer that performs transmission and reception of signals with the first RF chip, a shared memory portion and a second RF chip that are incorporated into the first reader/writer, and a second reader/writer that performs transmission and reception of signals with the second RF chip. A moveable body equipped with the first reader/writer obtains information stored in the first RF chip by being moved close to the first RF chip; the shared memory portion retains the information stored in the first RF chip that is obtained by the first reader/writer; the second RF chip reads out the information stored in the first RF chip that is stored in the shared memory portion; and the second reader/writer retrieves the information stored in the first RF chip and information stored in the second RF chip by the second RF chip and obtains information about the location of the second RF chip.

It is to be noted that the moveable body in the present invention may be an automatic transport device for the article.

Another article management method of the present invention is one that includes a first RF chip attached to an article, a first reader/writer that performs transmission and reception of signals with the first RF chip, a shared memory portion and a second RF chip that are incorporated into the first reader/writer, and a second reader/writer that performs transmission and reception of signals with the second RF chip. The first reader/writer is attached to an article management shelf for management of the article and obtains information stored in the first RF chip by the first RF chip being moved close thereto; the shared memory portion retains the information stored in the first RF chip obtained by the first reader/writer; the second RF chip reads out information stored in the first RF chip that is stored in the shared memory portion; and the second reader/writer obtains the information stored in the first RF chip and information stored in the second RF chip by the second RF chip and obtains information about the location of the second RF chip.

It is to be noted that the first RF chip in the present invention may include a battery and charging of the battery may be performed by wireless signals from a feeder.

It is to be noted that, in the present invention, the feeder may be attached to the article management shelf.

It is to be noted that, in the present invention, the first RF chip may be a passive RF chip.

It is to be noted that, in the present invention, information about the location of the second RF chip may be obtained by provision of a plurality of the second reader/writers.

By the present invention, even if an article is covered by shielding, reading out of data of the article can be performed easily. Accordingly, for a case when a barcode is attached to an article, the hassle of having to remove shielding or doing the like whenever the barcode cannot be read and the hassle of having to be ingenious in alignment of the article and the like can be eliminated.

In addition, in an article management method of the present invention, using active RF tags where introduction costs for attachment to each article are high is unnecessary, and information about the location of an article can be obtained. Meanwhile, when a passive RF tag where introduction costs for attachment to each article are low is used, a problem in that obtaining information about the location is limited to small warehouses due to the communication distances being short can be eliminated.

By the present invention as described above, an article management method that uses an RF chip by which inventory management can be simplified and introduction costs can be lowered can be provided.

DETAILED DESCRIPTION OF THE PREFERRED EMBODIMENT

Figure 1:
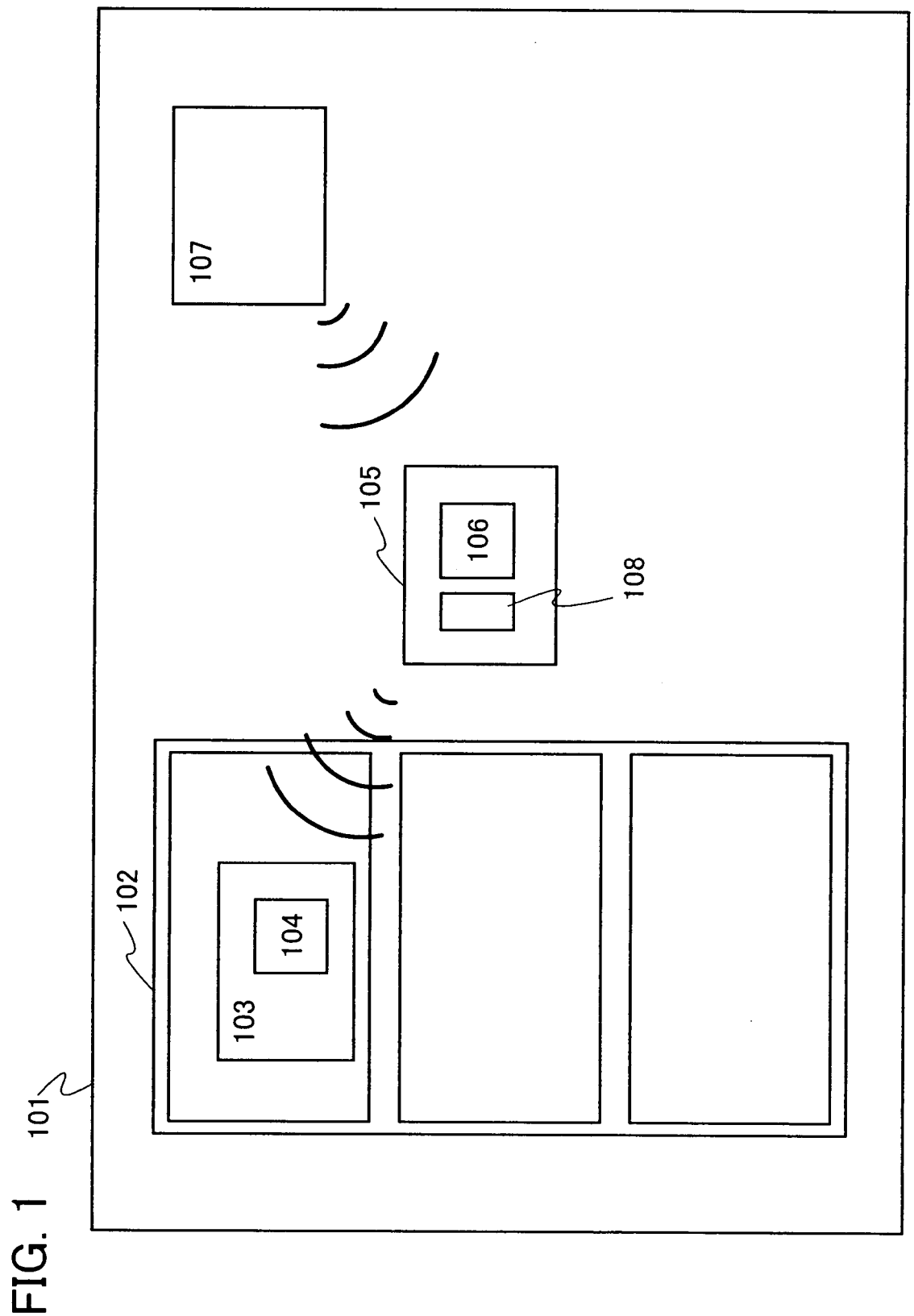
FIG. 1 is a block diagram used to describe a configuration of an article management method of the present invention.

Hereinafter, Embodiment Modes of the present invention will be described based on drawings. However, the present invention can be implemented in a lot of different modes, and it is to be easily understood by those skilled in the art that various changes and modifications can be made without any departure from the spirit and scope of the present invention. Accordingly, the present invention is not to be taken as being limited to the described content of the embodiment modes included herein. It is to be noted that common reference numerals indicate identical portions or portions having similar functions in all figures used to describe embodiment modes, and repetitive description thereof is omitted.

(Embodiment Mode 1)

One embodiment mode of an article management method that uses an RF chip of the present invention will be described using FIG. 1. FIG. 1 is a diagram illustrating a system configuration of an article management method that uses an RF chip of the present invention.

In FIG. 1, for describing the article management method that uses an RF chip of the present invention, an article management shelf 102, an article 103, a first RF chip 104 that is attached to the article 103, a first reader/writer 105 that reads information stored in the first RF chip 104, a second RF chip 106 that is incorporated into the first reader/writer 105, a second reader/writer 107 that detects information about the location of the second RF chip 106, and a shared memory portion 108 that is incorporated into the first reader/writer 105, all of which are placed within a space 101 into which the article management method is introduced, are shown.

It is to be noted that "information stored in the first RF chip 104" refers to identifying information that is stored in a memory element in the first RF chip 104 of an article to which the first RF chip 104 is attached. Examples of identifying information are represented by information about the country of manufacture, the date of manufacture, and the like.

Article management by an article management method in the present embodiment mode will be described. First, the article 103 to which the first RF chip 104 is attached is placed in the article management shelf 102. Next, an operator carrying the first reader/writer 105 patrols the space 101. When the operator reaches the article management shelf 102, the first reader/writer 105 detects the presence of the first RF chip 104, that is, the presence of the article 103. Then, information stored in the first RF chip 104 is retained in the shared memory portion 108 incorporated into the first reader/writer 105. The information stored in the first RF chip 104 that is retained in the shared memory portion 108 is read out by the second RF chip 106, and, after that, the information stored in the first RF chip 104 is obtained by the second reader/writer 107 along with information stored in the second RF chip 106. At that time, the second reader/writer 107 detects the location of the second RF chip 106, that is, the location of the first reader/writer 105. In this way, the location of the first reader/writer 105 at the time the presence of the first RF chip 104 is detected is specified and the location of the first reader/writer 105 is approximated as the location of the first RF chip 104, whereby information about the location of the first RF chip 104 placed in close proximity to the first reader/writer 105 can be obtained. That is, information about the location of the article 103 to which the first RF chip 104 is attached can be obtained.

Figure 11:
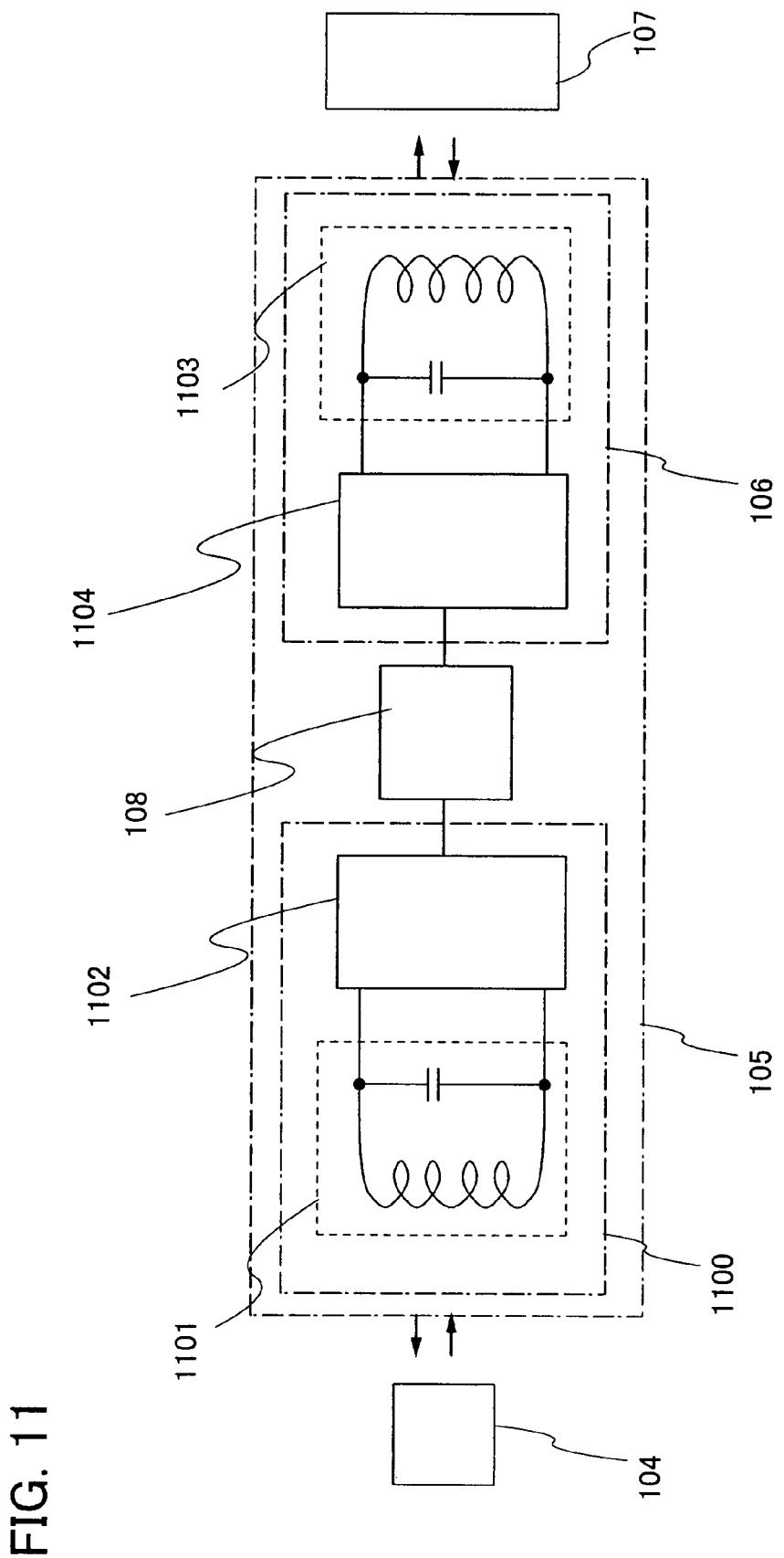
FIG. 11 is a diagram used to describe a configuration of an article management method of the present invention.

It is to be noted that connection of the shared memory portion 108 and the second RF chip 106 which are incorporated into the first reader/writer 105 in FIG. 1 is described using FIG. 11. In the first reader/writer 105 shown in FIG. 11, a reader/writer portion 1100 is connected to the shared memory portion 108. Furthermore, the shared memory portion 108 is connected to the second RF chip 106. That is, the shared memory portion 108 and the second RF chip 106 are integrated into the first reader/writer 105, internally or on a surface, as a part of a system of the first reader/writer 105.

The configuration shown in FIG. 11 will be further described, in detail. In FIG. 11, the reader/writer portion 1100 is formed by an antenna circuit 1101 and a transmitting and receiving controller portion 1102. It is to be noted that the antenna circuit 1101 has a configuration related to the transmission and reception of signals between the first RF chip 104 and itself, and the transmitting and receiving controller portion 1102 has a configuration related to the modulation and demodulation of signals in the transmission and reception of signals with the first RF chip 104 as well as the passing of data to the shared memory portion 108. In addition, in FIG. 11, the second RF chip 106 is formed of an antenna circuit 1103 and a signal processor 1104. It is to be noted that the antenna circuit 1103 has a configuration related to the transmission and reception of signals between the second reader/writer 107 and itself, and the signal processor 1104 has a configuration related to the modulation and demodulation of signals in the transmission and reception of signals with the second reader/writer 107 as well as the passing of data to the shared memory portion 108.

It is to be noted that, for memory of the shared memory portion 108, static memory (SRAM), dynamic memory (DRAM), ferroelectric memory (FeRAM), EEPROMs, flash memory, and the like can be given. However, the memory of the shared memory portion 108 is not limited to these, and memory used in general can be used.

It is to be noted that the first RF chip 104 can be set to be either a passive RF chip or an active RF chip. If the first RF chip 104 used in the article management method in the present embodiment mode is set to be a passive RF chip, introduction costs of the first RF chip can be lowered.

Furthermore, the second RF chip 106, as with the first RF chip 104, can be set to be either a passive RF chip or an active RF chip. If the second RF chip 106 used in the article management method in the present embodiment mode is set to be an active RF chip, when the article management method of the present invention is introduced into a large space (for example, a warehouse) or the like, the distance between the second RF chip 106 and the second reader/writer 107 can be set to be a long distance.

In addition, in detection of information about the physical location of the second RF chip 106 by the second reader/writer 107, a received signal strength indicator (RSSI) method can be used. For example, when the location of the second reader/writer 107 is set to be known and the source of communication signals is set to be the second RF chip 106, if a function for detection of signal strength is included in the second reader/writer 107, the location of the second RF chip 106 can be determined by calculation of the distance from the detected signal strength. In addition, when the location of the second reader/writer 107 is set to be known and the source of communication signals is set to be the second reader/writer 107, if a function for detection of signal strength is included in the second RF chip 106, the location of the second RF chip 106 can be determined by calculation of the distance from the detected signal strength.

Figure 2:
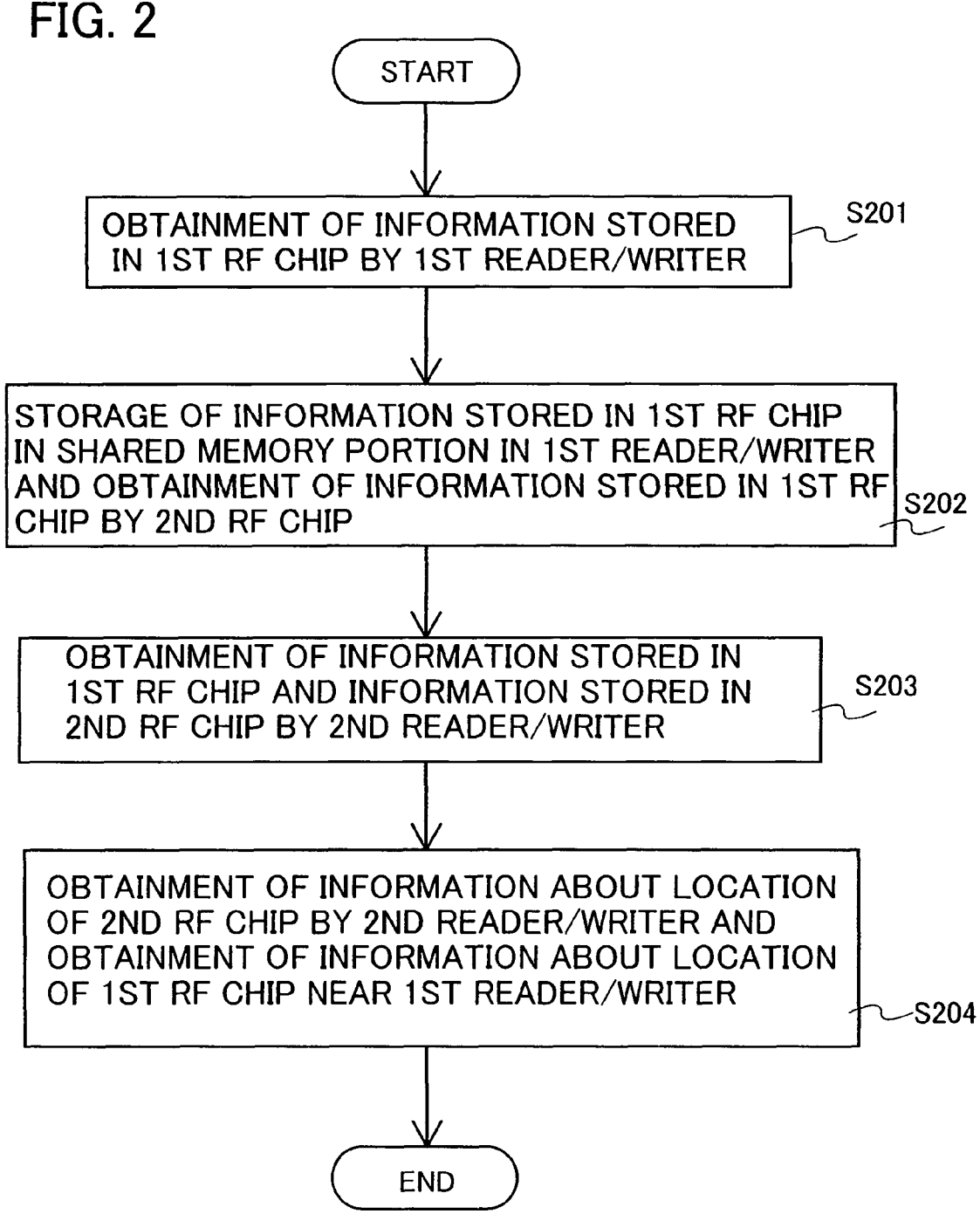
FIG. 2 is a flowchart used to describe a configuration of an article management method of the present invention.

Using the flowchart shown in FIG. 2, the article management method shown in FIG. 1 will be explained. It is to be noted that the present invention is not limited to a set of a first RF chip, a second RF chip, a shared memory portion, a first reader/writer, and a second reader/writer; however, for convenience of explanation, it will be limited to a set of a first RF chip, a second RF chip, a shared memory portion, a first reader/writer, and a second reader/writer here, and the flow of the article management method of the present invention will be explained.

First, obtainment of information stored in the first RF chip by the first reader/writer is performed (Step S201). That is, the first RF chip receives a signal from the first reader/writer by an antenna in the first RF chip, and the information stored in the first RF chip about an article to which the first RF chip is attached is transmitted to the first reader/writer.

Next, storage of the information that is stored in the first RF chip in the shared memory portion in the first reader/writer and the obtainment of the information stored in the first RF chip by the second RF chip are performed (Step S202). That is, the information stored in the first RF chip that the first reader/writer received by the first RF chip is retained in the shared memory portion that is incorporated into the first reader/writer. The second RF chip reads out the information stored in the first RF chip that is retained by the shared memory portion, and when it receives a signal from the second reader/writer, the information stored in the first RF chip, as well as information stored in the second RF chip, is transmitted to the second reader/writer.

Next, the second RF chip receives a signal from the second reader/writer by an antenna in the second RF chip, and the information stored in the second RF chip and the information stored in the first RF chip that has been read out by the shared memory portion is transmitted to the second reader/writer (Step S203).

Next, a signal from the second reader/writer is received by an antenna in the second RF chip that is included in the first reader/writer, and the distance between the second reader/writer and the second RF chip is calculated based on the strength of the signal transmitted to the second reader/writer from the first RF chip (Step S204). As a result, by obtainment of information about the location of the second RF chip, obtainment of information about the location of the first reader/writer can be performed. By the information stored in the first RF chip and the information stored in the second RF chip in Step S203, the location of the first RF chip, which is placed in close proximity to the first reader/writer, can be estimated. That is, the information about the location of the first RF chip, which is information about the location of the article, can be obtained from the information about the location of the first reader/writer, which is information about the location of the second RF chip.

It is to be noted that for a detection method for obtainment of information about the location of an RF chip, an RSSI method may be used. The RSSI method is a method that uses the characteristic that the signal strength of communication signals decreases as the distance from a signal source increases. For example, when the location of a reader/writer is set to be known and the source of the communication signals is set to be the RF chip, if a function for detection of signal strength is included in the reader/writer, the location of the RF chip can be determined by calculation of the distance from the detected signal strength. Alternatively, when the location of the reader/writer is set to be known and the source of communication signals is set to be the reader/writer, if a function for detection of signal strength is included in the RF chip, the location of the RF chip can be determined by calculation of the distance from the detected signal strength. As a result, in the present invention, by arrangement of a plurality of second reader/writers and obtainment of signals from the second RF chip by a plurality of known positions, an even more accurate position can be specified.

In operations from Step S201 to Step S204, by arrangement of a plurality of second reader/writers in a space, information about the location of an article to which the first RF chip is attached can be obtained. It is to be noted that the plurality of second reader/writers are arranged in a space, information about the location of an article obtained by the plurality of second reader/writers is communicated to a server via an LAN (a local area network) or the like, and an administrator can use this information to ascertain the location of the article from a separate room.

Figure 3:
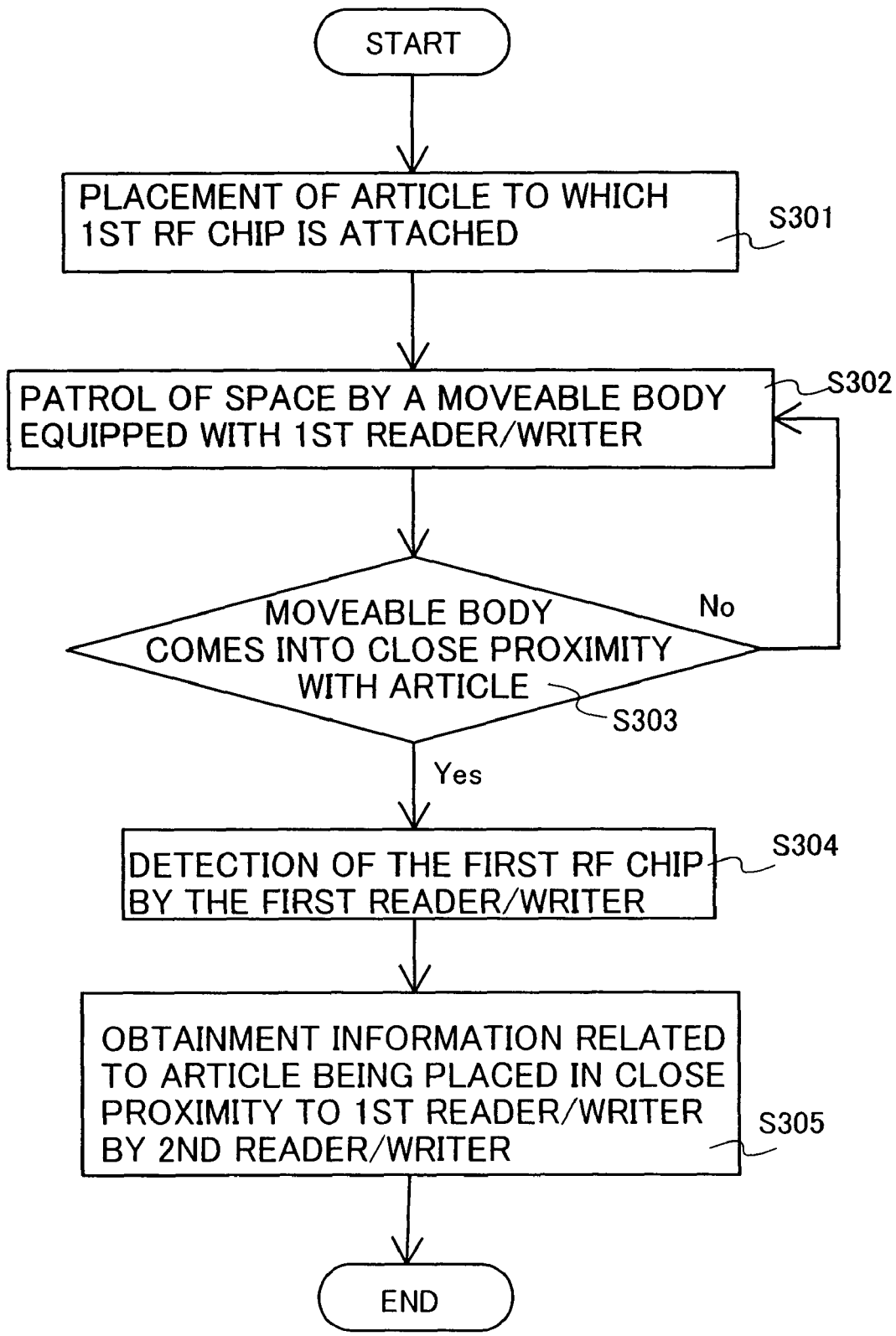
FIG. 3 is a flowchart used to describe a configuration of an article management method of the present invention.

Using the flowchart shown in FIG. 3, Step S201 of the flowchart of the article management method shown in FIG. 2 will be explained in more detail. It is to be noted that the present invention is not limited to a set of a first RF chip, a second RF chip, a shared memory portion, a first reader/writer, and a second reader/writer; however, for convenience of explanation, it will be limited to a set of a first RF chip, a second RF chip, a shared memory portion, a first reader/writer, and a second reader/writer here, and the flow of the article management method of the present invention will be explained.

First, placement of the article to which the first RF chip is attached is performed (Step S301). It is to be noted that, by attachment of the first RF chip to the top, bottom, or side of the article or by embedding of the first RF chip within packing material, the location of the article can be approximated as being the location of the first RF chip. In addition, for the article to which the first RF chip is attached, a condition is assumed in which a plurality of articles, to each of which a first RF chip, each with a separate individual number, is attached, are present.

Next, patrol of the space by a moveable body equipped with the first reader/writer is performed (Step S302). The patrol of the space equipped with the first reader/writer in the present embodiment mode is performed by an operator. Also, it is desirable that the first reader/writer that is attached to an automatic transport (patrol) device be set as the configuration for patrol of the space. In this case, in addition to being able to be used to reduce operator labor costs, the article management method of the present invention can be introduced for management of articles stored in narrow areas or in dangerous areas into which an operator cannot enter.

Next, as the moveable body that is equipped with the first reader/writer patrols the space, the moveable body comes into close proximity with the article to which the RF chip is attached (Step S303).

In Step S303, when the proximity of the moveable body is not close enough to the article, the moveable body continues to patrol the space (NO in Step S303). In Step S303, when the proximity of the moveable body is close enough to the article (YES in Step S303), detection of the first RF chip by the first reader/writer is performed (Step S304).

It is to be noted that the distance between the moveable body and the article in the present embodiment mode being close refers to a distance at which transmission and reception of signals between the first RF chip and the first reader/writer are possible. Consequently, communication distances differ according to the frequency band used in the transmission and reception of the signals.

Next, by performance of the detection of the first RF chip by the first reader/writer in Step S304 and by obtainment of information stored in each of the first RF chip and the second RF chip and information about the location of the second RF chip by the second reader/writer through the shared memory portion, information related to the article, to which the first RF chip is attached, being placed in close proximity to the first reader/writer can be obtained (Step S305).

As described above, by the present invention, read out of data of an article by a shielding can easily be performed. Accordingly, for a case when a barcode is attached to an article, the hassle of having to remove shielding or doing the like whenever the barcode cannot be read and the hassle of having to be ingenious in alignment of the article and the like can be eliminated.

In addition, in an article management method of the present invention, attaching active RF tags whose introduction costs are high to each article is unnecessary, and information about the location of an article (location of a space) can be obtained. Meanwhile, by attachment of passive RF tags whose introduction costs are low to each article, a problem in that obtaining information about the location is limited to small warehouses due to the communication distance being short can be eliminated.

That is, by the present invention, an article management method that uses RF chips by which inventory management can be simplified and introduction costs can be lowered can be provided.

In addition, the present embodiment mode can be implemented in combination with a technical element or elements of any other embodiment mode or modes.

(Embodiment Mode 2)

In the present embodiment mode, a configuration of an article management method different from the configuration of the article management method described in the above embodiment mode will be described.

In the above embodiment mode, a configuration in which, by the moveable body equipped with the first reader/writer 105 to which the second RF chip 106 is attached being moved close to the proximity of the article 103, the whereabouts of the first RF chip 104, that is, information about the location of the article, are obtained was shown. In the present embodiment mode, an embodiment in which the first reader/writer 105 in which the second RF chip 106 is included is fixed to and installed in an article management shelf or the like will be described.

Figure 4:
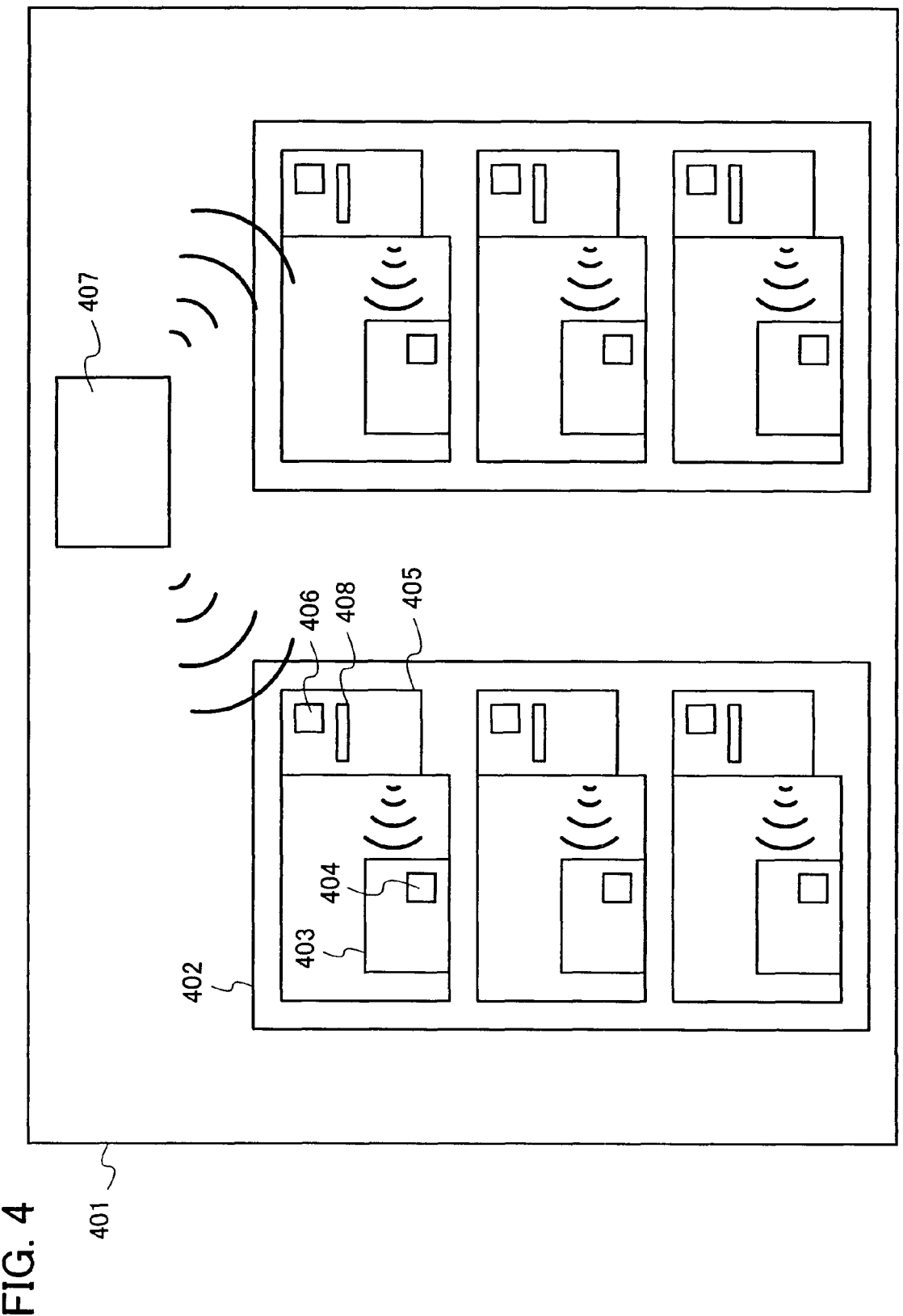
FIG. 4 is a block diagram used to describe a configuration of an article management method of the present invention.

A embodiment mode different from the article management method of Embodiment Mode 1 that uses an RF chip of the present invention will be described using FIG. 4. FIG. 4 is a diagram illustrating a system configuration of an article management method that uses an RF chip in the present invention.

In FIG. 4, for describing the article management method that used an RF chip of the present invention, an article management shelf 402, an article 403, a first RF chip 404 that is attached to the article 403, a first reader/writer 405 that reads the first RF chip 404, a second RF chip 406 that is incorporated into the first reader/writer 405, a second reader/writer 407 that detects information about the physical location of the second RF chip 406, and a shared memory portion 408 that is incorporated into the first reader/writer 405, all of which are placed within a space 401 into which the article management method is introduced, are shown.

In the present embodiment mode, article management by an article management method will be described. First, the article 403 to which the first RF chip 404 is attached is placed in the article management shelf 402. Next, information stored in the first RF chip 404 is read, and whether the first RF chip 404 is present or not, that is, whether the article 403 is present or not, is detected by the first reader/writer 405 that is installed in the article management shelf 402. Then, information stored in the first RF chip 404 is retained in the shared memory portion 408 incorporated into the first reader/writer 405. The information stored in the first RF chip 404 that is retained in the shared memory portion 408 is read out by the second RF chip 406, and, after that, the information stored in the first RF chip 404 is obtained by the second reader/writer 407 along with the information stored in the second RF chip 406. At that time, the second reader/writer 407 detects the location of the second RF chip 406, that is, the location of the first reader/writer 405. In this way, the location of the first reader/writer 405 at the time the presence of the first RF chip 404 is detected is specified and the location of the first reader/writer 405 is approximated as the location of the first RF chip 404, whereby information about the location of the first RF chip 404 placed in close proximity to the first reader/writer 405 can be acquired. That is, information about the location of the article 403 to which the first RF chip 404 is attached can be obtained.

It is to be noted that the first reader/writer 405 in FIG. 4 is similar to the reader/writer 105 of FIG. 11 that is described in Embodiment Mode 1, and the explanation given above is incorporated herein.

It is to be noted that the first RF chip 404 can be set to be either a passive RF chip or an active RF chip. If the first RF chip 404 used in the article management method in the present embodiment mode is set to be a passive RF chip, introduction costs of the first RF chip can be lowered.

In the invention of the present embodiment mode, the article management shelf may be a container used for the performance of article management or a pallet used for article management. Of course, there are no particular limitations on the form as long as it is a configuration that is provided with the second reader/writer and by which articles are stored. The configuration may be selected as appropriate, in accordance with the intended use.

Furthermore, the second RF chip 406, as with the first RF chip 404, can be set to be either a passive RF chip or an active RF chip. If the second RF chip 406 used in the article management method in the present embodiment mode is set to be an active RF chip, when the article management method of the present invention is introduced into a large space (for example, a warehouse) or the like, the distance between the second RF chip 406 and the second reader/writer 407 can be set to be a long distance. In the present embodiment mode, in particular, because the first reader/writer 405 is installed in the article management shelf 402, the second RF chip 406 is also installed in the article management shelf 402 in the same way. As a result, in the first RF chip 404, the structure may be one in which transmission and reception of signals is performed using a supply of power received from external.

In addition, by the second reader/writer 407, in detection of information about the physical location of the second RF chip 406, an RSSI method can be used. For example, when the location of the second reader/writer 407 is set to be known and the source of communication signals is set to be the second RF chip 406, if a function for the detection of signal strength is included in the second reader/writer 407, the location of the second RF chip 406 can be determined by calculation of the distance from the detected signal strength. In addition, when the location of the second reader/writer 407 is set to be known and the source of communication signals is set to be the second reader/writer 407, if a function for the detection of signal strength is included in the second RF chip 406, the location of the second RF chip 406 can be determined by calculation of the distance from the detected signal strength.

By use of the configuration of the present embodiment mode, a plurality of the first reader/writers 405 each having the second RF chip 406 are each prepared and placed in each article shelf. In addition, information about the location of each of the second RF chips 406 that are placed in each article shelf is detected by the second reader/writer 407. Accordingly, real-time article management becomes possible, and article management can be performed even more efficiently.

As described above, by the present invention, even if an article is covered by shielding, read out of data of the article can easily be performed. Accordingly, for a case when a barcode is attached to an article, the hassle of having to remove shielding or doing the like whenever the barcode cannot be read and the hassle of having to be ingenious in alignment of the article and the like can be eliminated.

In addition, in an article management method of the present invention, attaching active RF tags whose introduction costs are high to each article is unnecessary, and information about the location of an article (location of a space) can be obtained. Meanwhile, by attachment of passive RF tags whose introduction costs are low to each article, a problem in that obtaining information about the location is limited to small warehouses due to the communication distance being short can be eliminated.

Furthermore, in particular, by use of the configuration of the present embodiment mode, a plurality of the first reader/writers 405 each having the second RF chip 406 are each prepared and placed in each article shelf. Information about the location of the second RF chips that are placed in each article shelf is detected by the second reader/writer 407. In the present embodiment mode, in this way, real-time article management becomes possible, and article management can be performed even more efficiently.

That is, by the present invention, an article management method that uses RF chips by which inventory management can be simplified and introduction costs can be lowered can be provided.

In addition, the present embodiment mode can be implemented in combination with a technical element or elements of any other embodiment mode or modes.

(Embodiment Mode 3)

In the present embodiment mode, as an example, a configuration of a location detection method of the first reader/writer in which the second RF chip is incorporated in the article management method of the present invention will be described.

Figure 5:
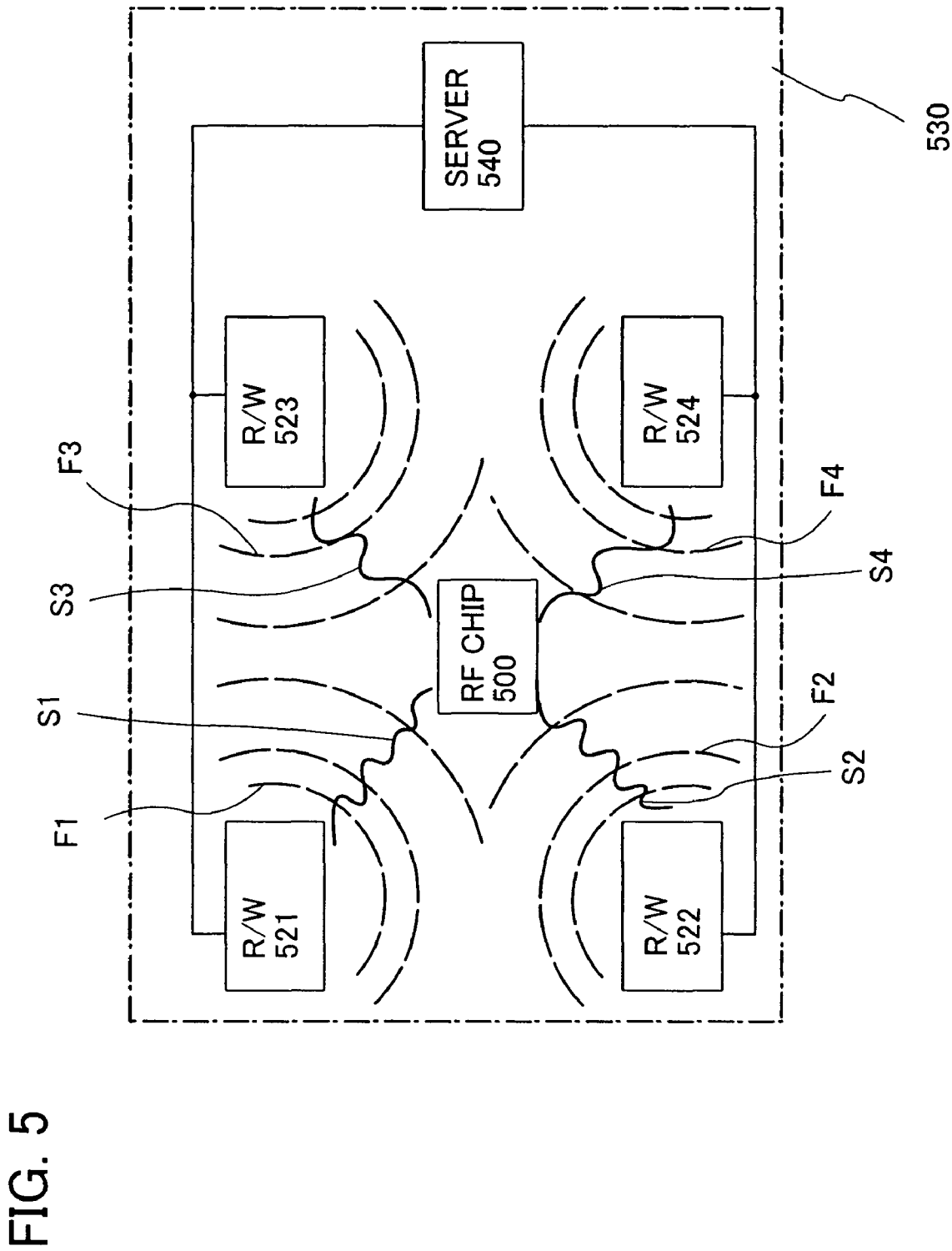
FIG. 5 is a diagram used to describe a location detection method in an article management method of the present invention.

It is to be noted that, for the location detection method described in the present embodiment mode, an example in which, as signals propagate through space, the distance between the RF chip and the reader/writer and the location of the RF chip are detected using the reduction in electric field strength in response to the distance of the propagating waves is given and explained. That is, the location detection method described in the present embodiment mode is a method in which, as is described above in Embodiment Mode 1, the location of the first reader/writer is detected by performance of communication between the second reader/writer and the second RF chip. FIG. 5 is a block diagram used to describe the location detection method of the present invention. It is to be noted that the reader/writer and the RF chip shown in FIG. 5 correspond to the second reader/writer and the second RF chip that are described above in Embodiment Mode 1.

As shown in FIG. 5, an RF chip 500 is arranged surrounded by a reader/writer 521, a reader/writer 522, a reader/writer 523, and a reader/writer 524. Of course, in the present embodiment mode, the number of reader/writers is not limited to four. For detection of the location of the RF chip 500 in three-dimensional space, there should be at least four reader/writers. This point is described below. It is to be noted that if the detection of the location of the RF chip 500 can be performed using two-dimensional coordinates, there should be at least three reader/writers. In addition, if only the distance between the RF chip 500 and the reader/writer is measured, there should be at least one reader/writer.

The reader/writers 521 to 524 are connected to a server 540 by an LAN (a local area network) or the like. The server 540 controls the reader/writers 521 to 524 and detects the location of the RF chip based on signals from the reader/writers 521 to 524. The connection between the server 540 and the reader/writers 521 to 524 as well as the connection between all of the reader/writers 521 to 524 can be established by either a wired or wireless network.

It is to be noted that, in the present embodiment mode, each of the reader/writers includes a function for input of signals of an unspecified frequency and wireless transmission and reception of signals with the RF chip.

Each of the reader/writers 521 to 524 outputs a signal of equal electric field strength used for distance detection. Hereinafter, these signals are specified as a signal F1, a signal F2, a signal F3, and a signal F4 (refer to FIG. 5). When the distance between the RF chip 500 and a given reader/writer is measured or the location of the RF chip 500 is determined, in order that the signals F1 to F4 do not overlap with each other, that is, in order that the RF chip 500 not receive signals from a plurality of reader/writers simultaneously, the reader/writers 521 to 524 transmit the signals F1 to F4 sequentially. The timing at which the reader/writers 521 to 524 transmit the signals F1 to F4 is controlled by the server 540.

Figure 6:
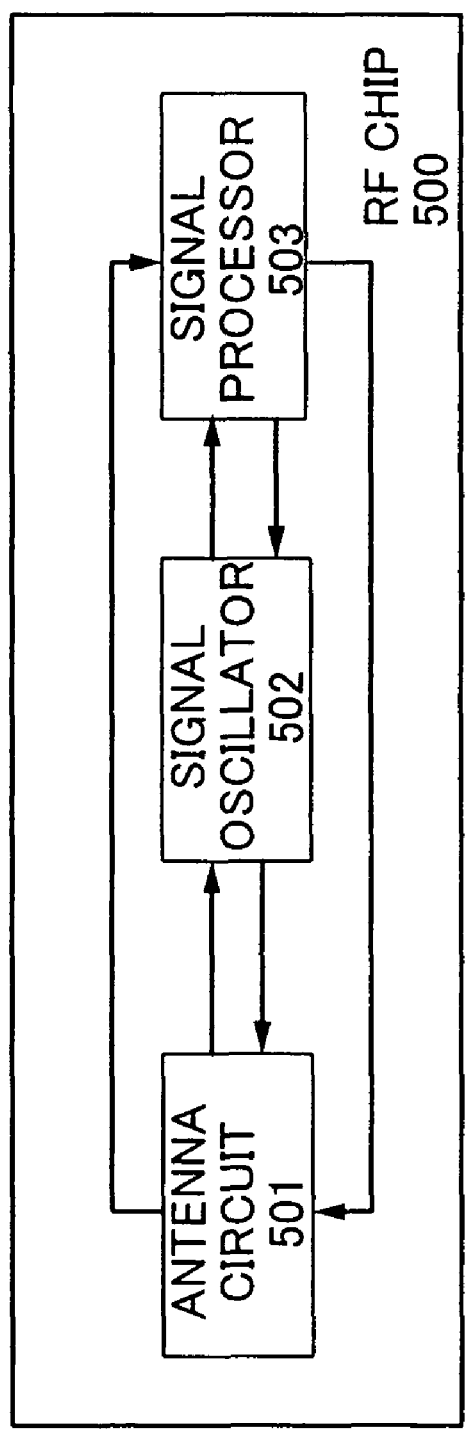
FIG. 6 is a diagram used to describe a location detection method in an article management method of the present invention.

The RF chip 500 includes a function for the reception of the signals F1 to F4 that are transmitted from the reader/writers 521 to 524 and a function for the transmission of the signals S1 to S4 that are generated by the reception of the signals F1 to F4. FIG. 6 is a block diagram illustrating a basic structure of the RF chip 500 of the present invention. The RF chip 500 in FIG. 6 is formed of an antenna circuit 501, a signal oscillator 502, and a signal processor 503.

As shown in FIG. 6, signals are input and output between the antenna circuit 501 and the signal oscillator 502, and signals are input and output between the signal oscillator 502 and the signal processor 503. The antenna circuit 501 is a circuit that receives signals from external and transmits signals to external. That is, the signals F1 to F4 from the reader/writers 521 to 524 shown in FIG. 5 are received by the antenna circuit 501, and the signals S1 to S4 are transmitted from the antenna circuit 501.

The signal oscillator 502 has a function for the oscillation and output of a pulse signal based on the signals received by the antenna circuit 501. For this reason, the signal oscillator 502 is provided with a pulse oscillator circuit. The pulse oscillator circuit has a function by which pulse signals of different frequencies depending on the voltage of input signals can be oscillated. This kind of pulse oscillator circuit can be formed, for example, of a rectifier circuit and a ring oscillator circuit to which signals are input from the rectifier circuit.

It is to be noted that, in the present specification, the pulse signal refers to a signal whose voltage changes cyclically. For example, the pulse signal is a wave whose voltage is cyclically amplified, as with a rectangular wave, a triangular wave, a sawtooth wave, or a sine wave.

In addition, the signal processor 503 has a function for the counting of the number of pulses of the pulse signal output by the signal oscillator 502. For this reason, the signal processor 503 includes a counter that counts the number of pulses of the pulse signal output by the signal oscillator 502.

There are no particular limitations on the shape of an antenna in the antenna circuit 501. That is, for a transmission method for signals applicable to the antenna circuit 501 in the RF chip 500, an electromagnetic coupling method, an electromagnetic induction method, a microwave method, or the like can be used. A practitioner should select the transmission method as appropriate upon consideration of the intended use application and provide an antenna with the most appropriate length and shape based on the transmission method.

For example, when an electromagnetic coupling method or an electromagnetic induction method (for example, frequency at the 13.56 MHz band) is employed for the transmission method, because electromagnetic induction by changes in the electric field density is used, a conductive film that functions as the antenna is formed as a ring (for example, as a loop antenna) or a spiral (for example, as a spiral antenna).

Alternatively, when a microwave method (for example, frequency in the UHF band (a band from 860 MHz to 960 MHz), at the 2.45 GHz band, or the like) is employed for the transmission method, the length and shape of a conductive film that functions as the antenna may be selected as appropriate with consideration of the wavelength of electromagnetic waves used in the transmission of the signals. The conductive film that functions as the antenna can be formed, for example, as a linear shape (for example, as a dipole antenna), a planar shape (for example, as a patch antenna), or the like. In addition, the shape of the conductive film that functions as the antenna is not limited to a linear shape but may be a curved shape or a serpentine shape or a combination of any of these shapes with consideration of the wavelength of the electromagnetic waves.

The location detection method described in the present embodiment mode is a method for the detection of the distance between an RF chip and a reader/writer and the location of the RF chip using the decrease in electric field strength in response to the propagation distance of a signal as the signal propagates through space.

Figure 7:
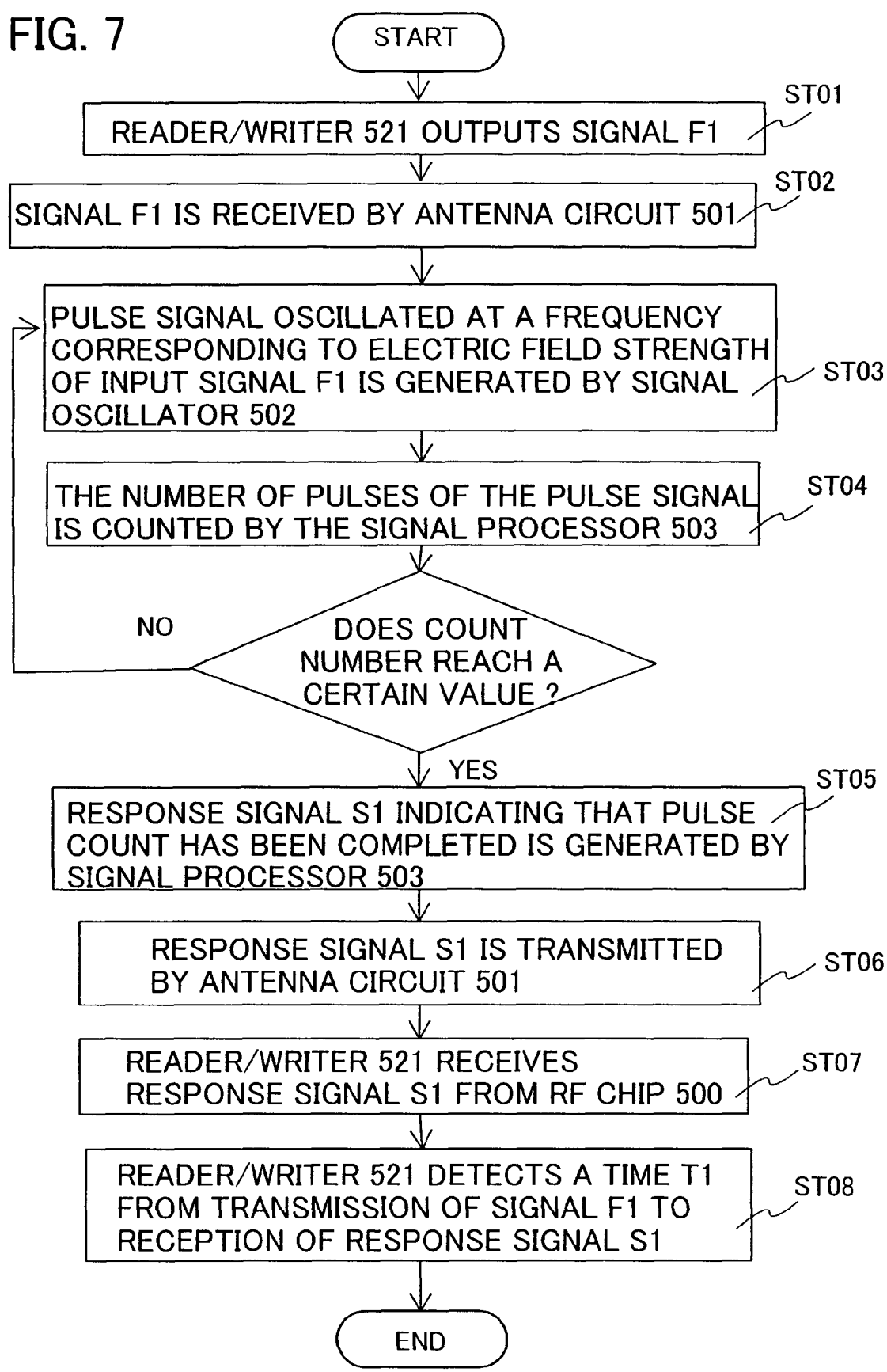
FIG. 7 is a diagram used to describe a location detection method in an article management method of the present invention.

Using the flowchart shown in FIG. 7, the location detection method shown in FIG. 5 will be described. It is to be noted that the number of reader/writers is not limited to four in the present invention; however, for convenience of explanation, the number of reader/writers will be limited to four here, and the flow of the location detection method of the present embodiment mode will be explained.

First, for the detection of the distance between the RF chip 500 and the reader/writer 521, the reader/writer 521 outputs the signal F1 (Step ST01). The RF chip 500 receives the signal F1 from the reader/writer 521 by the antenna circuit 501 (Step ST02).

The signal F1 received by the antenna circuit 501 is output to the signal oscillator 502. A pulse signal oscillated at a frequency corresponding to the electric field strength of the input signal F1 is generated by the signal oscillator 502 (Step ST03).

The signal F1 received by the antenna circuit 501 is rectified, a direct current voltage made to be direct current is generated, and a pulse signal is oscillated by the oscillator circuit with this direct current power supply voltage set as a power supply voltage, whereby this kind of pulse signal can be generated.

The pulse signal oscillated by the signal oscillator 502 is input to the signal processor 503. The number of pulses of the pulse signal is counted by the signal processor 503 until the number reaches a certain value (Step ST04).

When the count number reaches a certain value, the signal S1 (response signal) indicating that the pulse count has been completed is generated by the signal processor 503 (Step ST05). The response signal S1 is output to the antenna circuit 501 from the signal processor 503. The response signal S1 is transmitted by the antenna circuit 501 (Step ST06). The reader/writer 521 receives the response signal S1 from the RF chip 500 (Step ST07). When the response signal S1 is received, the reader/writer 521 detects a time T1 from the transmission of the signal F1 to the reception of the response signal S1 (Step ST08). Here, this time T1 is defined as the response time T1.

It is to be noted that the response time T1 depends on the oscillation frequency of the pulse signal oscillated by the signal oscillator 502 within the RF chip 500. Furthermore, the oscillation frequency of the pulse signal depends on the electric field strength of the signal F1 at the time the signal F1 is received by the RF chip 500, and the electric field strength of the signal F1 at the time the signal F1 is received by the RF chip 500 depends on the distance between the RF chip 500 and the reader/writer 521. Because the electric field strength of the signal F1 at the time the signal F1 is received by the RF chip 500 becomes weaker as the distance between the RF chip 500 and the reader/writer 521 increases, the oscillating frequency of the pulse signal decreases. As a result, the amount of time needed for the counting of the pulse by the signal oscillator 502 increases, and the response time T1 measured by the reader/writer 521 increases. That is, because the response time T1 measured by the reader/writer 521 corresponds to the frequency of the pulse signal oscillated by the signal oscillator 502, the distance between the RF chip 500 and the reader/writer 521 can be detected from the response time T1.

Operations from Step ST01 to Step ST08 are performed by the reader/writer 522, the reader/writer 523, and the reader/writer 524 sequentially, and a response time T2, a response time T3, and a response time T4 are detected by the reader/writers 522 to 524, respectively. Selection of the reader/writer that performs communication with the RF chip 500 is controlled by a command from the server 540. It is to be noted that when the location of the RF chip 500 is to be specified by three-dimensional coordinates, the response time should be measured by at least four reader/writers, and so, if there are five or more reader/writers in a space 530, the response time need not be measured by all of the reader/writers.

The reader/writers 521 to 524 arranged in the space 530 send the calculated response times T1 to T4 to the server 540 via an LAN (a local area network) or the like. The server 540 calculates a distance D1 between the reader/writer 521 and the RF chip 500, a distance D2 between the reader/writer 522 and the RF chip 500, a distance D3 between the reader/writer 523 and the RF chip 500, and a distance D4 between the reader/writer 524 and the RF chip 500 based on the response time T1 received from the reader/writer 521, the response time T2 received from the reader/writer 522, the response time T3 received from the reader/writer 523, and the response time T4 received from the reader/writer 524, respectively. From these distances D1 to D4 and from information about the location (spatial coordinates, more specifically, relative coordinates) of each of the reader/writers 521 to 524, the location (spatial coordinates) of the RF chip 500 can be determined.

As in the above description, by measurement of the distance between the RF chip 500 and a reader/writer, the location of the RF chip 500 in the space 530 can be detected. If an administrator accesses the server 540, he or she can find out where the RF chip 500 is.

In particular, if the structure of the present invention is set to be the structure of the present embodiment mode, information about where an RF chip is located in a space can be acquired. In addition, by regular searches for information about the location of the RF chip, information about the trajectory (also referred to as flow line) of a reader/writer equipped with the RF chip can be acquired. Specifically, by provision of a plurality of second reader/writers and arrangement of the plurality of second reader/writers within a space, information about the location of the second RF chip can be acquired. Accordingly, real-time article management becomes possible, and article management can be performed even more efficiently.

In addition, the present embodiment mode can be implemented in combination with a technical element or elements of any other embodiment mode or modes. That is, by the present invention, even if an article is covered by shielding, read out of data of the article can easily be performed. Accordingly, for a case when a barcode is attached to an article, the hassle of having to remove shielding or doing the like whenever the barcode cannot be read and the hassle of having to be ingenious in alignment of the article and the like can be eliminated.

In addition, in an article management method of the present invention, attaching active RF tags whose introduction costs are high to each article is unnecessary, and information about the location of an article (location of a space) can be obtained. Meanwhile, by attachment of passive RF tags whose introduction costs are low to each article, a problem in that obtaining information about the location is limited to small warehouses due to the communication distance being short can be eliminated.

(Embodiment Mode 4)

In the present embodiment mode, an even more specific structure of the second RF chip 500 employed in the location detection system of Embodiment Mode 3 will be described. It is to be noted that description of a structure similar to that of Embodiment Mode 3 will be kept simple; for details, the explanation in Embodiment Mode 3 is incorporated herein.

Figure 9:
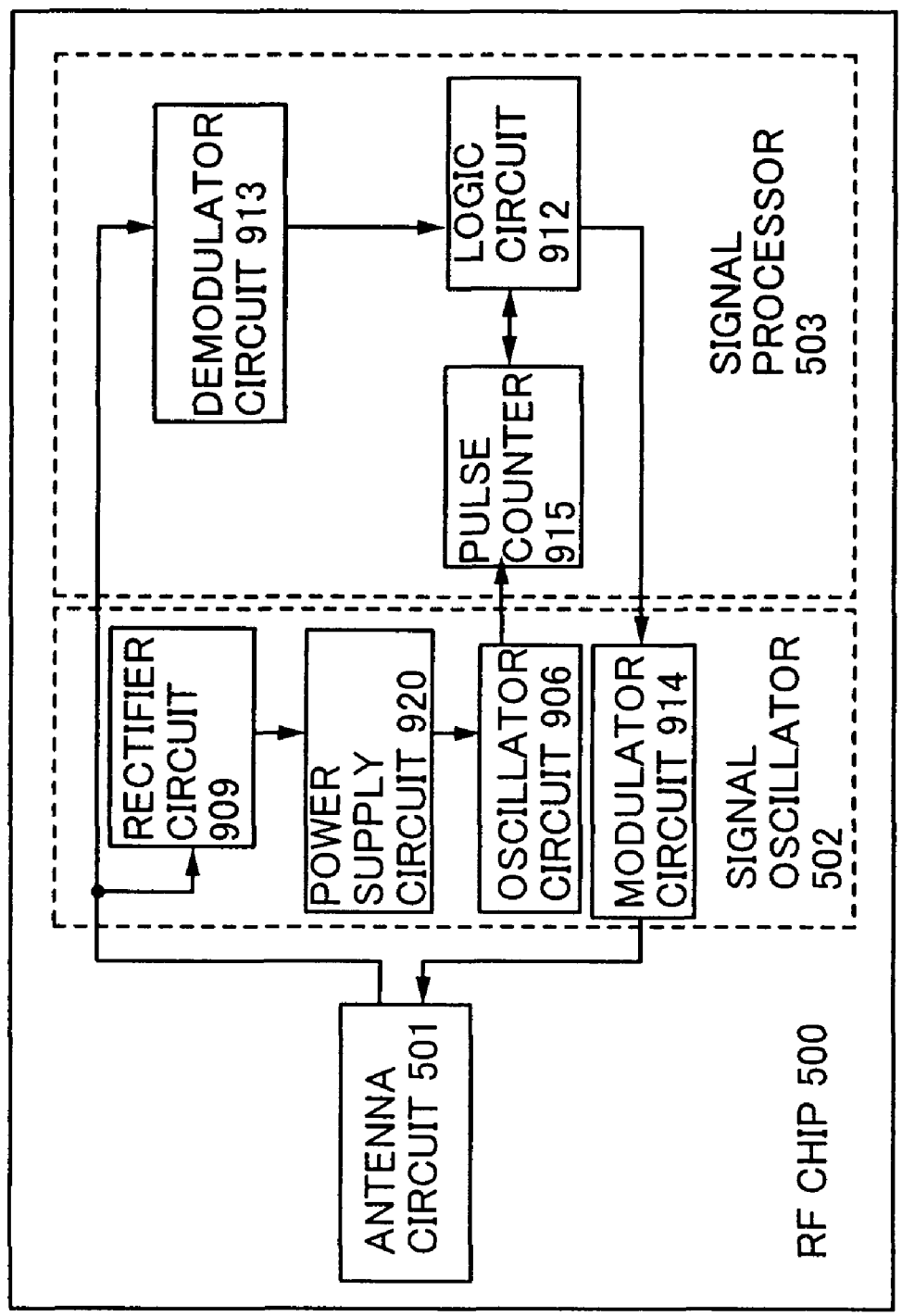
FIG. 9 is a block diagram used to describe a location detection method in an article management method of the present invention.

FIG. 9 is a block diagram of an RF chip of the present embodiment mode. As shown in FIG. 9, the RF chip 500, similar to the one in FIG. 6, is formed mainly by the antenna circuit 501, the signal oscillator 502, and the signal processor 503.

The signal oscillator 502 includes a rectifier circuit 909 to which signals received by the antenna circuit 501 are input, a power supply circuit 920 to which output signals of the rectifier circuit 909 are input, and an oscillator circuit 906 that is connected to an output of the power supply circuit 920. Furthermore, the signal oscillator 502 includes a modulator circuit 914 that modulates input signals from the signal processor 503 and outputs the modulated signals to the antenna circuit 501.

The oscillator circuit 906 is formed of a ring oscillator that is connected to a plurality of inverters in a circle. Output signals of the antenna circuit 501 are half-wave rectified and made to be a direct current by the rectifier circuit 909. The signals that are made to be a direct current are smoothed out in the power supply circuit 920, and a direct current voltage is generated in response to the amplitude of the output signals of the antenna circuit 501. The direct current voltage generated by the power supply circuit 920 is set to be a power supply voltage, and a pulse signal is oscillated by the oscillator circuit 906 at a frequency corresponding to the level of voltage of the direct current voltage. In this way, the signal oscillator 502 can generate a pulse signal oscillated at a frequency that depends on the electric field strength (amplitude) of the signals output from the antenna circuit 501.

The signal processor 503 includes a demodulator circuit 913, a logic circuit 912, and a pulse counter 915. After the signals output from the antenna circuit 501 are demodulated by the demodulator circuit 913, the demodulated signals are input to a logic circuit 912. The output signals of the logic circuit 912 are modulated by the modulator circuit 914 and input to the antenna circuit 501. The pulse counter 915 is a circuit used to measure the pulse (number of oscillations) of the pulse signal oscillated by the oscillator circuit 906.

Figure 10:
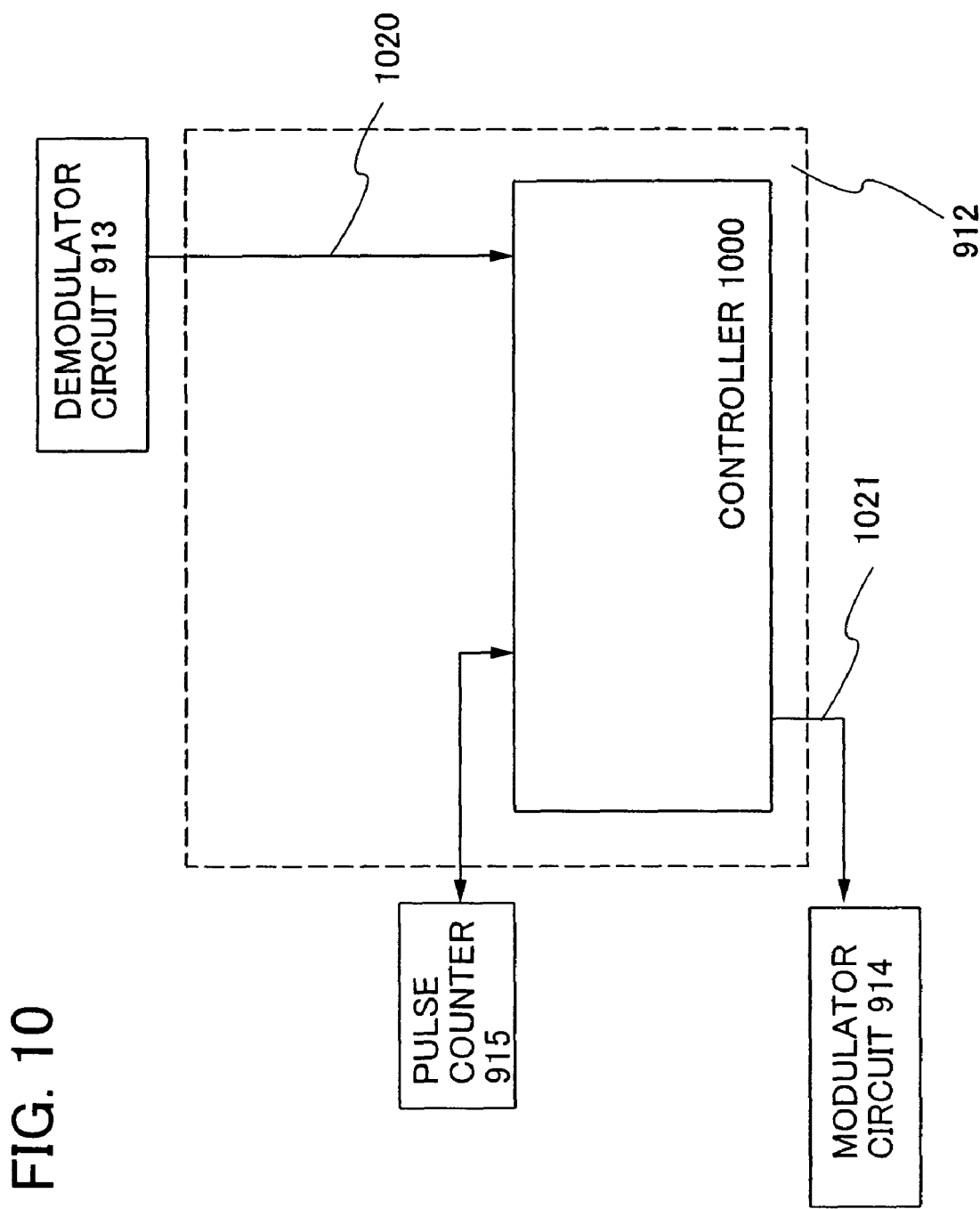
FIG. 10 is a block diagram used to describe a location detection method in an article management method of the present invention.

The logic circuit 912 is a circuit that decodes the content of signals from a reader/writer input through the demodulator circuit 913 and performs an assessment of the RF chip 500. A block diagram of the logic circuit 912 is shown in FIG. 10. As shown in FIG. 10, the logic circuit 912 includes a controller 1000. The controller 1000 controls the pulse counter 915, decodes the content of a signal 1020, and outputs a given signal 1021 to the modulator circuit 914 based on the signal 1020 demodulated by the demodulator circuit 913.

Hereinafter, operations of a location detection method using the RF chip of the present embodiment mode will be described. The operations of the location detection method of the present embodiment mode are the same as those of Embodiment Mode 3 (refer to FIG. 7).

First, in order to obtain the distance between the reader/writer 521 and the RF chip 500, the reader/writer 521 transmits the signal F1 to the RF chip 500. A command for starting signal processing in the signal processor 503 is contained in the signal F1. In the RF chip 500, when the antenna circuit 501 receives the signal F1 that is transmitted from the reader/writer 521, the signal F1 received by the antenna circuit 501 is input to the rectifier circuit 909 of the signal oscillator 502 and the demodulator circuit 913 of the signal processor 503.

The signal F1 is rectified by the rectifier circuit 909 and made to be a direct current, and the signal made to be a direct current is smoothed out by the power supply circuit 920. As a result, a direct current voltage is generated in response to the electric field strength (amplitude) of the signal F1. A pulse is oscillated by the oscillator circuit 906 with this direct current voltage as a power supply voltage.

Meanwhile, the demodulator circuit 913 demodulates the modulated signal F1, and the demodulated signal 1020 is input to the controller 1000. The controller 1000 controls the pulse counter 915 and makes the pulse counter 915 count the number of pulses of the pulse signal oscillated by the oscillator circuit 906 until the count reaches a given value, based on commands of the signal 1020. It is to be noted that the given value up to which this pulse counter 915 is made to count can be changed in the controller 1000. In this case, this given value should be changed as appropriate so that it matches the frequency of the signals transmitted from the reader/writer. It is to be noted that when a CPU is provided in the logic circuit 912, the given value up to which this pulse counter 915 is made to count can be changed by the CPU and by the controller 1000, as well.

The controller 1000 generates the response signal 1021 indicating that the count is completed once the count value reaches a given value and outputs the response signal 1021 to the modulator circuit 914. The response signal 1021 is modulated by the modulator circuit 914 and transmitted from the antenna circuit 501 as the response signal S1. When the first reader/writer 521 receives the response signal S1, the first reader/writer 521 detects the response time T1 from the transmission of the signal F1 to the reception of the response signal S1. The nearer the distance from the reader/writer 521 to the antenna circuit 501, the stronger the electric field strength of the signal F1 at the time it is received by the antenna circuit 501 becomes, and the amplitude of the output signals of the antenna circuit 501 is high. Consequently, because a high direct current voltage is generated by the power supply circuit 920, the pulse signal is oscillated by the oscillator circuit 906 at a high frequency, and the counting performed by the pulse counter 915 finishes in a short length of time. That is, the distance between the reader/writer 521 and the antenna circuit 501 is reflected in the count time of the pulse counter 915. Accordingly, the distance can be measured from the time T1 that the RF chip 500 needs to respond to the signal F1 of the reader/writer 521.

Similarly, the reader/writer 522, the reader/writer 523, and the reader/writer 524 detect the response time T2, the response time T3, and the response time T4, respectively, as well. As described in Embodiment Mode 3, the server 540 measures the distance between each of the reader/writers 521 to 524 and the RF chip 500 from the data received from each of the reader/writers 521 to 524, and from the calculated distances and information about the location (spatial coordinates, more specifically, relative coordinates) of each of the reader/writers 521 to 524, the location (spatial coordinates) of the RF chip 500 can be detected. If an administrator accesses the server 540, he or she can acquire information about the location of the RF chip 500.

As in the above description, by measurement of the distance between the RF chip 500 and a reader/writer, the location of the RF chip 500 in the space 530 can be detected. If an administrator accesses the server 540, he or she can find out where the RF chip 500 is.

In particular, if the structure of the present invention is set to be the structure of the present embodiment mode, information about where an RF chip is located in a space can be acquired. In addition, by regular searches for information about the location of the RF chip, information about the trajectory (also referred to as flow line) of a reader/writer that is equipped with the RF chip can be acquired. Specifically, by provision of a plurality of second reader/writers and arrangement of the plurality of second reader/writers within a space, information about the location of the second RF chip can be obtained. Accordingly, real-time article management becomes possible, and article management can be performed even more efficiently.

In addition, the present embodiment mode can be implemented in combination with a technical element or elements of any other embodiment mode or modes. That is, by the present invention, even if an article is covered by shielding, read out of data of the article can easily be performed. Accordingly, for a case when a barcode is attached to an article, the hassle of having to remove shielding or doing the like whenever the barcode cannot be read and the hassle of having to be ingenious in alignment of the article and the like can be eliminated.

In addition, in an article management method of the present invention, attaching active RF tags whose introduction costs are high to each article is unnecessary, and information about the location of an article (location of a space) can be obtained. Meanwhile, by attachment of passive RF tags whose introduction costs are low to each article, a problem in that obtaining information about the location is limited to small warehouses due to the communication distance being short can be eliminated.

(Embodiment Mode 5)

In the present embodiment mode, a configuration including an electric storage means (an electric power storage means) that can be charged by the first RF chip and the second RF chip in the article management method of the present invention will be described. The electric storage means is not connected to a charger by a wiring but can be charged using electric power of electromagnetic waves from external. Consequently, operations for checking the remaining battery capacity and for changing a battery, as with a battery for an active RF chip, become unnecessary. Additionally, because electric power used to drive the RF chip can be continuously stored up in the electric storage means, enough electric power to drive the RF chip can be continuously obtained, and communication can be performed more stably compared to communication with a passive RF chip.

So, in the present embodiment mode, a configuration in which an electric storage means is included in each of the first RF chip and the second RF chip that are described in Embodiment Mode 1 will be described briefly. A feeder is provided for charging of the electric storage means in each of the first RF chip and the second RF chip. It is to be noted that for a feeder that supplies electric power used to charge the first RF chip, in particular, the first reader/writer may have a configuration with that function. In this case, having the first reader/writer be in the state of being installed in the article management shelf as described in Embodiment Mode 2 is preferred because charging can be performed more stably in that state. The first RF chip in the present embodiment mode shall be described hereinafter as an RF chip that is provided with an antenna circuit, a signal processing circuit that processes signals received by the antenna circuit, and an electric storage means that stores electric power produced by the signal processing circuit.

The antenna circuit in the RF chip is a circuit that receives signals and transmits signals. The antenna circuit is connected to a signal processor that will be described below.

The signal processing circuit in the RF chip includes a power supply section and a logic section. The power supply section generates a direct current voltage from signals received by the antenna circuit. In addition, sending the direct current voltage to the electric storage means for charging and supplying the direct current voltage to the logic section are both performed by the power supply section. The logic section operates by the power supply voltage supplied by the power supply section. The logic section is a circuit that analyzes signals received by the antenna circuit and generates transmission signals.

The electric storage means is a medium by which electric power produced from wireless signals (electromagnetic waves) is stored. For the electric storage means, a storage battery (battery) such as a lithium-ion battery, a lithium secondary battery, a nickel hydride battery, a nickel-cadmium battery, an organic radical battery, or the like can be used. The type of storage battery is not limited to these. Alternatively, a capacitor such as a capacitor with a large storage capacity or the like can be used for the electric storage means. For a capacitor, a layered ceramic capacitor or an electric double layer capacitor can be used.

Figure 8:
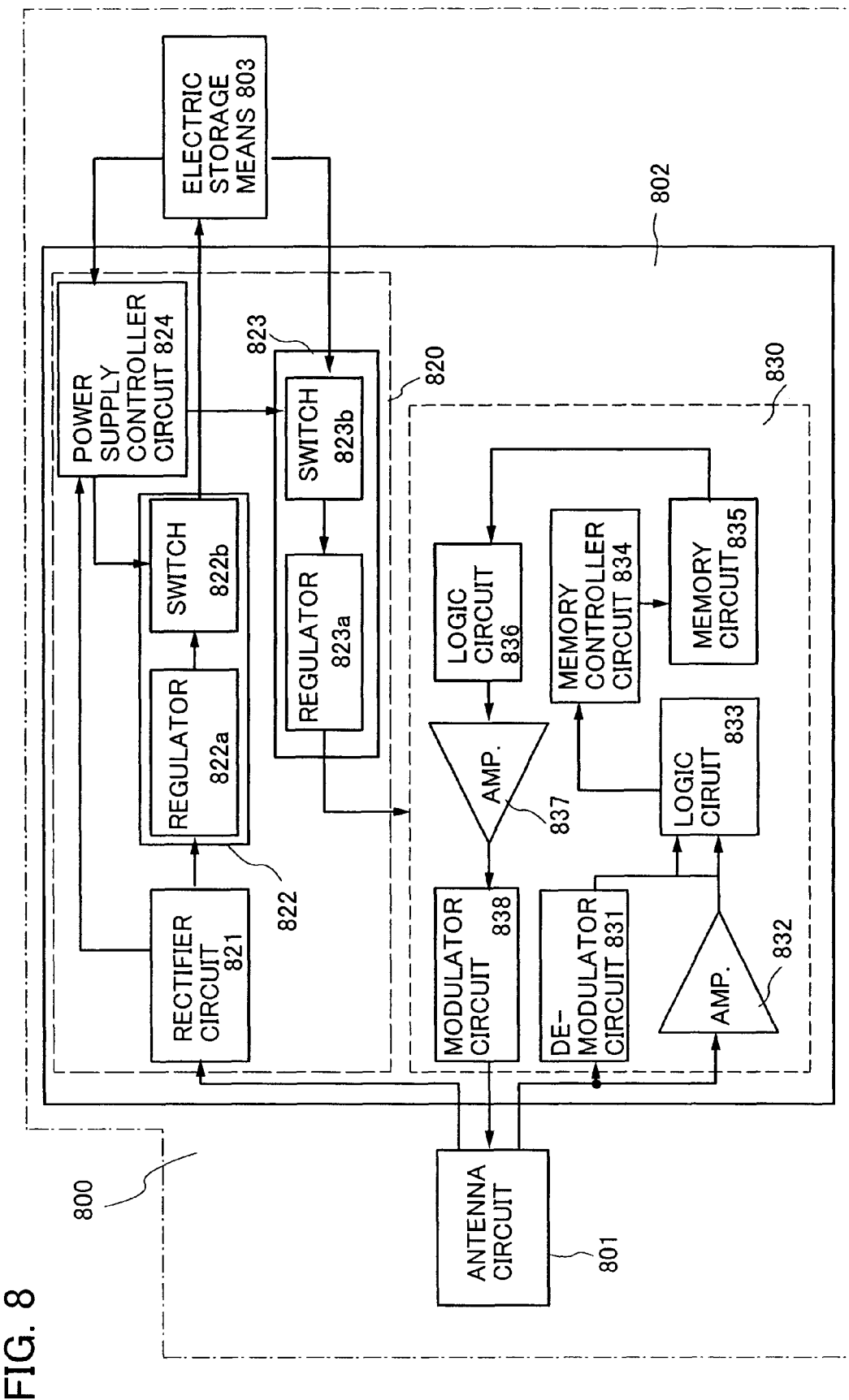
FIG. 8 is a block diagram used to describe an example of a structure of an RF chip in an article management method of the present invention.

Next, using FIG. 8, an example of a structure of an RF chip 800 will be described. FIG. 8 is a block diagram of the RF chip 800. The RF chip 800 includes an antenna circuit 801, a signal processing circuit 802, and an electric storage means 803.

The antenna circuit 801 performs transmission and reception of signals. The antenna circuit 801 detects signals of a frequency band based on the shape of an antenna, converts the signals to a direct current power supply voltage, and supplies electric power to the electric storage means.

For the electric storage means 803, a so-called storage battery (battery) can be applied. For example, a secondary battery such as a lithium-ion battery, a lithium secondary battery, a nickel hydride battery, a nickel-cadmium battery, an organic radical battery, a lead storage battery, an air secondary battery, a nickel-zinc battery, a silver zinc battery, or the like can be applied. It is to be noted that, for the electric storage means 803, in addition to a storage battery (battery), a capacitor that is a capacitor with a large capacity (for example, a layered ceramic capacitor, an electric double layer capacitor, or the like) can be applied. In particular, because the charge and discharge capacity of a lithium-ion battery and a lithium secondary battery are both high, by application thereof in the RF chip 800 of the embodiment mode of the present invention, miniaturization can be achieved. In a metal lithium battery, by use of a transition metal oxide that contains lithium ions, a metal oxide, a metal sulfide, an iron-based compound, a conductive polymer, an organic sulfur-based compound, or the like for a positive electrode active material; use of lithium (an alloy) for a negative electrode active material; and use of an organic-based electrolyte solution, a polymer electrolyte, or the like for an electrolyte, the charge and discharge capacity can be increased.

By formation of the active material and electrolyte of a lithium-ion battery by a sputtering method, the electric storage means 803 can be formed over a substrate over which the signal processing circuit 802 is formed or, alternatively, over a substrate over which the antenna circuit 801 is formed. By formation of the electric storage means 803 over the substrate over which the signal processing circuit 802 and the antenna circuit 801 are formed, the thickness and weight of the RF chip 800 can be reduced.

The signal processing circuit 802 is mainly divided into a power supply section 820 and a logic section 830. The power supply section 820 includes, as shown in FIG. 8, a rectifier circuit 821 that is connected to an output of the antenna circuit 801, a charging controller circuit 822 that is connected to an output of the rectifier circuit 821, a power supply circuit 823 that is connected to an output of the electric storage means 803, and a power supply controller circuit 824 that controls the charging controller circuit 822 and the power supply circuit 823.

The charging controller circuit 822 includes a regulator 822a and a switch 822b that is connected to an output of the regulator 822a. The output of the regulator 822a is connected to the electric storage means 803 through the switch 822b.

The rectifier circuit 821 performs half-wave rectification of alternating current signals received by the antenna circuit 801, smoothes the alternating current signals, and produces a direct current voltage. The direct current voltage output from the rectifier circuit 821 is set to be a direct current voltage of a constant voltage that is input to the regulator 822a of the charging controller circuit 822. The regulator 822a outputs the generated constant voltage to the electric storage means 803 through the switch 822b and charges the electric storage means 803. The regulator 822a is a circuit that maintains a constant voltage so that a voltage exceeding specifications is not applied to the electric storage means 803. It is to be noted that, by the regulator 822a, regarding the input direct current voltage, not only the voltage but also the current may be set so as to be constant. In addition, if the switch 822b is set to be a rectifier element like a diode, the regulator 822a may be omitted. That is, the charging controller circuit 822 can be set to have a simple structure that includes a rectifier element only.

The power supply circuit 823 includes a regulator 823a and a switch 823b that is connected to an input of the regulator 823a. The input of the regulator 823a is connected to an output of the electric storage means 803 through the switch 823b. An output of the regulator 823a is connected to the logic section 830. Electric power by which the electric storage means 803 is charged is supplied to the logic section 830 from the power supply circuit 823. The power supplied from the electric storage means 803 is set to be a constant voltage power supply by the regulator 823a, whereby input to the logic section 830 of a voltage exceeding specifications can be prevented. It is to be noted that, by the regulator 823a, regarding the input direct current voltage, not only the voltage but also the current may be set so as to be constant.

The power supply controller circuit 824 is a circuit that controls charging of the electric storage means 803 and supply of power to the logic section 830. An output of the electric storage means 803 is connected to the power supply controller circuit 824, and the state of charge of the electric storage means 803 is monitored using this output. In addition, an output of the rectifier circuit 821 is connected to the power supply controller circuit 824, and from this output, the magnitude of the amplitude (the magnitude of the electric field) of signals received by the antenna circuit 801 is monitored. The power supply controller circuit 824 monitors the output of the electric storage means 803 and the rectification circuit 821 and controls ON and OFF of the switch 822b and switch 823b. For example, for control of the switch 823b, the switch 823b is turned ON when the amount of voltage of the electric storage means 803 reaches or exceeds a given value, $V_1$, and electric power of the electric storage means 803 is supplied to the logic section 830. When the amount of voltage drops to or below a given value, $V_2$ ($V_1 > V_2$), the switch 823b is turned OFF, and the supply of electric power to the logic section 830 is stopped. For example, the set value for $V_1$ is set to be an amount of voltage by which the logic section 830 can be driven stably, and the set value for $V_2$ is set to be the minimum amount of voltage needed to drive the logic section 830.

The logic section 830 includes a demodulator circuit 831, an amplifier 832, a logic circuit 833, a memory controller circuit 834, a memory circuit 835, a logic circuit 836, an amplifier 837, and a modulator circuit 838, each of which is connected as shown in FIG. 8. In the logic section 830, the amplifier 832 increases the amplitude of the signals input to the antenna circuit 801 and supplies the signals to the logic circuit 833 as a clock. In addition, a communicated signal modulated by ASK modulation or PSK modulation is demodulated by the demodulator circuit 831. After being demodulated, the signal is also transmitted to the logic circuit 833 and analyzed. The signal analyzed by the logic circuit 833 is transmitted to the memory controller circuit 834. Based on this signal, the memory controller circuit 834 controls the memory circuit 835, and data stored in the memory circuit 835 is retrieved and transmitted to the logic circuit 836. After the data is encoded by the logic circuit 836, the signal is amplified by the amplifier 837, and by this signal, modulation is applied to the signal output from the antenna circuit 801 by the modulating circuit 838. Here, the power supply in FIG. 8 is supplied via the power supply section 820 by the electric storage means 803 that is provided externally from the logic section 830. The logic section 830 of the RF chip 800 operates in this way.

In the RF chip 800 shown in FIG. 8, an RF battery is formed of the antenna circuit 801, the power supply section 820, and the electric storage means 803. Hereinafter, a method for charging of the RF battery and for supplying of the electric power stored in the RF battery will be described.

In the RF chip 800, the electric storage means 803 can be charged automatically by reception of electromagnetic waves. In addition, the antenna circuit 801 can detect signals of a frequency band that depends on the shape of an antenna, convert the signals to a direct current power supply voltage, and generate electric power. Furthermore, by use of a so-called charger, a device that can transmit electromagnetic waves exclusively used for charging, in exchange for a reader/writer, the electric storage means 803 can be charged intentionally and the state where electric power in the RF chip 800 is drained can be prevented. Because a reader/writer includes a function for the transmission of signals exclusively used for charging, the reader/writer can be made to function as a charger, as well.

As is described above, by performance of charging using wireless signals in the RF chip, there is no need to change out batteries, and the article management method can be set to be one that uses an RF chip by which transmission and reception of signals can be performed at long distances as with an active RF chip. For this reason, the first reader/writer or the second reader/writer can perform transmission and reception of signals for the first RF chip or the second RF chip even more reliably.

In addition, the present embodiment mode can be implemented in combination with a technical element or elements of any other embodiment mode or modes. That is, by the present invention, even if an article is covered by shielding, read out of data of the article can easily be performed. Accordingly, for a case when a barcode is attached to an article, the hassle of having to remove a shield or doing the like whenever the barcode cannot be read and the hassle of having to be ingenious in alignment of the article and the like can be eliminated.

In addition, in an article management method of the present invention, attaching active RF tags whose introduction costs are high to each article is unnecessary, and information about the location of an article (location of a space) can be obtained. Meanwhile, by attachment of passive RF tags whose introduction costs are low to each article, a problem in that obtaining information about the location is limited to small warehouses due to the communication distance being short can be eliminated.

This application is based on Japanese Patent Application serial no. 2006-260530 filed with the Japan Patent Office on Sep. 26, 2006, the entire contents of which are hereby incorporated by reference.

What is claimed is:
1. An article management method comprising steps of:
attaching a first RF chip to an article in a space;
providing a plurality of second reader/writers in the space, each of the plurality of second reader/writers set on a known location in the space, wherein each of the plurality of second reader/writers is separate from the first RF chip;

moving a first reader/writer in the space, the first reader/writer comprising a shared memory portion and a second RF chip;

retrieving first information stored in the first RF chip by the first reader/writer when the first reader/writer is in close proximity to the first RF chip;

retaining the first information stored in the first RF chip retrieved by the first reader/writer in the shared memory portion;

reading out the first information stored in the first RF chip from the shared memory portion by the second RF chip; and retrieving the first information stored in the first RF chip and second information stored in the second RF chip and obtaining third information about a location of the second RF chip by the plurality of second reader/writers, wherein the first RF chip is a passive RF chip and the second RF chip is an active RF chip.

2. The article management method according to claim 1, wherein a location of the first reader/writer at the time a presence of the first RF chip is detected is specified and the location of the first reader/writer is approximated as a location of the first RF chip.

3. The article management method according to claim 1, wherein the space is a warehouse.

4. An article management method comprising steps of:
attaching a first RF chip to an article in a space;
providing a plurality of second reader/writers in the space, each of the plurality of second reader/writers set on a known location in the space, wherein each of the plurality of second reader/writers is separate from the first RF chip;

moving a movable object equipped with a first reader/writer in the space, wherein the first reader/writer further comprises a shared memory portion and a second RF chip;

obtaining first information stored in the first RF chip by the first reader/writer when the first reader/writer is close to the first RF chip;

retaining the first information stored in the first RF chip retrieved by the first reader/writer in the shared memory portion;

reading out the first information stored in the first RF chip from the shared memory portion by the second RF chip; and retrieving the first information stored in the first RF chip and second information stored in the second RF chip and obtaining third information about a location of the second RF chip by the plurality of second reader/writers, wherein the first RF chip is a passive RF chip and the second RF chip is an active RF chip.

5. The article management method according to claim 4, wherein the movable object is an automated transportation device for the article.

6. The article management method according to claim 4, wherein a location of the first reader/writer at the time a presence of the first RF chip is detected is specified and the location of the first reader/writer is approximated as a location of the first RF chip.

7. The article management method according to claim 4, wherein the space is a warehouse.

8. An article management method comprising steps of:
attaching a first RF chip to an article;
disposing the article on an article management shelf in a space;
providing a first reader/writer on the article management shelf, wherein the first reader/writer comprises a shared memory portion and a second RF chip;
providing a second reader/writer set on a known location in the space, wherein the second reader/writer is separate from the first RF chip;
retrieving first information stored in the first RF chip by the first reader/writer attached to the article management shelf;
retaining the first information stored in the first RF chip retrieved by the first reader/writer in the shared memory portion;
reading out the first information stored in the first RF chip from the shared memory portion by the second RF chip; and
retrieving the first information stored in the first RF chip and second information stored in the second RF chip and obtaining third information about a location of the second RF chip by the second reader/writer,
wherein the first RF chip is a passive RF chip and the second RF chip is an active RF chip.

9. The article management method according to claim 8, wherein the first RF chip includes a battery and charging of the battery is performed by use of a wireless signal from a feeder.

10. The article management method according to claim 9, wherein the feeder is attached to the article management shelf.

11. The article management method according to claim 8, wherein a location of the first reader/writer at the time a presence of the first RF chip is detected is specified and the location of the first reader/writer is approximated as a location of the first RF chip.

12. The article management method according to claim 8, wherein the space is a warehouse.

* * * * *